United States Patent
Lu

(10) Patent No.: US 10,315,265 B2
(45) Date of Patent: Jun. 11, 2019

(54) WORKTABLE FOR SOLDERING IRON

(71) Applicant: Ming-Chin Lu, New Taipei (TW)

(72) Inventor: Ming-Chin Lu, New Taipei (TW)

(*) Notice: Subject to any disclaimer, the term of this patent is extended or adjusted under 35 U.S.C. 154(b) by 97 days.

(21) Appl. No.: 15/788,870

(22) Filed: Oct. 20, 2017

(65) Prior Publication Data

US 2018/0111212 A1    Apr. 26, 2018

(30) Foreign Application Priority Data

Oct. 26, 2016 (TW) .............................. 105216282 U

(51) Int. Cl.
| | | |
|---|---|---|
| *B23K 37/00* | (2006.01) | |
| *B23K 3/02* | (2006.01) | |
| *B23K 3/06* | (2006.01) | |
| *B23K 37/04* | (2006.01) | |
| *B23K 1/00* | (2006.01) | |
| *B23K 101/42* | (2006.01) | |

(52) U.S. Cl.
CPC ............ *B23K 3/027* (2013.01); *B23K 1/0016* (2013.01); *B23K 3/02* (2013.01); *B23K 3/063* (2013.01); *B23K 37/00* (2013.01); *B23K 37/0408* (2013.01); *B23K 2101/42* (2018.08)

(58) Field of Classification Search
CPC ...... B23K 3/027; B23K 37/00; B23K 1/0016; B23K 37/0408; B23K 3/063; B23K 2101/42; B23K 3/02–0392; B23K 3/08–087; B23K 37/04–0538
USPC ......... 228/44.3, 44.7, 47.1, 49.1, 49.4, 49.5, 228/51–55, 212–213
See application file for complete search history.

(56) References Cited

U.S. PATENT DOCUMENTS

| | | | | | |
|---|---|---|---|---|---|
| 2,213,439 | A | * | 9/1940 | Young ..................... | B23K 3/027 219/231 |
| 3,267,254 | A | * | 8/1966 | Weller .................... | B23K 3/027 211/70.6 |
| 3,924,097 | A | * | 12/1975 | Knowles ................. | B23K 3/027 219/229 |
| 3,948,678 | A | * | 4/1976 | Dezzani ................. | B23K 3/028 134/6 |
| 3,990,623 | A | * | 11/1976 | Fortune .................. | B23K 3/027 228/57 |
| 4,999,480 | A | * | 3/1991 | Smith ..................... | B23K 3/027 219/228 |
| 5,025,973 | A | * | 6/1991 | Newton ................... | B23K 3/08 219/238 |
| 5,261,590 | A | * | 11/1993 | Tsai ....................... | B23K 3/0615 228/41 |
| 5,415,338 | A | * | 5/1995 | Wilkes ................... | B23K 3/063 228/13 |

(Continued)

*Primary Examiner* — Kiley S Stoner
(74) *Attorney, Agent, or Firm* — Guice Patents PLLC

(57) ABSTRACT

A worktable for a soldering iron a base plate with two fixed plates perpendicularly extending from the top thereof. At least one of the two fixed plates has a first locking member and a first notch. A movable plate is movably located between the two fixed plates for securing a larger part. The movable plate has a second notch for securing small part. An adjustment member rotatably extends through the two fixed plates and the movable plate to adjust a fitting distance for the solder parts. An axle is connected across the two fixed plates and carries a soldering wire roll thereto. A soldering iron seat is located beside one of the two fixed plates for receiving the soldering iron therein.

9 Claims, 12 Drawing Sheets

(56) References Cited

U.S. PATENT DOCUMENTS

| | | | | |
|---|---|---|---|---|
| 7,866,530 | B1* | 1/2011 | Riachentsev | B23K 3/027 219/229 |
| 8,091,757 | B1* | 1/2012 | Stawarski | B23K 3/063 228/4.5 |
| 2002/0179680 | A1* | 12/2002 | Poletaev | B23K 3/063 228/105 |
| 2004/0232289 | A1* | 11/2004 | Aguirre | B23K 3/027 248/117.2 |
| 2006/0091598 | A1* | 5/2006 | Wong | B23K 37/04 269/45 |
| 2006/0135004 | A1* | 6/2006 | Wong | B23K 3/08 439/894 |
| 2008/0067164 | A1* | 3/2008 | Kuo | B23K 3/027 219/242 |
| 2009/0050673 | A1* | 2/2009 | Althoff | B23K 3/047 228/11 |
| 2010/0089975 | A1* | 4/2010 | Martin | B23K 3/022 228/51 |
| 2010/0108827 | A1* | 5/2010 | Teraoka | B23K 3/027 248/117.3 |
| 2015/0115017 | A1* | 4/2015 | Harbaugh | B23K 37/0408 228/44.3 |
| 2015/0251263 | A1* | 9/2015 | Chang | B23K 3/026 219/230 |
| 2016/0361771 | A1* | 12/2016 | Stuckey | B23K 3/027 |
| 2017/0127532 | A1* | 5/2017 | Pinto, IV | B23K 1/19 |
| 2018/0079037 | A1* | 3/2018 | Applegate | B23K 37/0533 |

\* cited by examiner

WORKTABLE FOR SOLDERING IRON

BACKGROUND OF THE INVENTION

1. Fields of the Invention

The present invention relates to a worktable, and more particularly, to a worktable for a soldering iron.

2. Descriptions of Related Art

The conventional way to solder electric parts such as to solder an electric part to a circuit board, the user usually operates the soldering iron by one hand, and uses the other hand to hold the soldering wire. The circuit board is clamped by a vise arranged on the worktable. However, the vise cannot be moved as desired. When soldering two small electric parts, the vise is not a suitable tool to position the small electric parts.

The present invention intends to provide a worktable for a soldering iron, and the worktable provides necessary functions when using the soldering iron.

SUMMARY OF THE INVENTION

The present invention relates to a worktable for a soldering iron, and comprises a base plate, and two fixed plates perpendicularly extend from the top of the base plate. Each fixed plate has a first locking member and a first notch which is defined in the front end of the fixed plate corresponding thereto. The locking member extends through the top of the fixed plate and is inserted into the first notch. The two respective first notches of the two fixed plates are located corresponding to each other. A movable plate is movably located between the two fixed plates and has a second notch defined in the front end thereof. A second locking member is connected to the top of the movable plate and extends through the top of the movable plate and is inserted into the second notch. The two respective first notches of the two fixed plates and the second notch of the movable plate are located corresponding to each other. An adjustment member rotatably extends through the two fixed plates and the movable plate to adjust the movable plate. An axle is connected across the two fixed plates and carries a soldering wire roll thereto. A soldering iron seat is located beside one of the two fixed plates for receiving the soldering iron therein.

The primary object of the present invention is to provide a worktable for a soldering iron, and the worktable combines the soldering wire roll, the soldering iron seat and the vise together.

The present invention will become more apparent from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
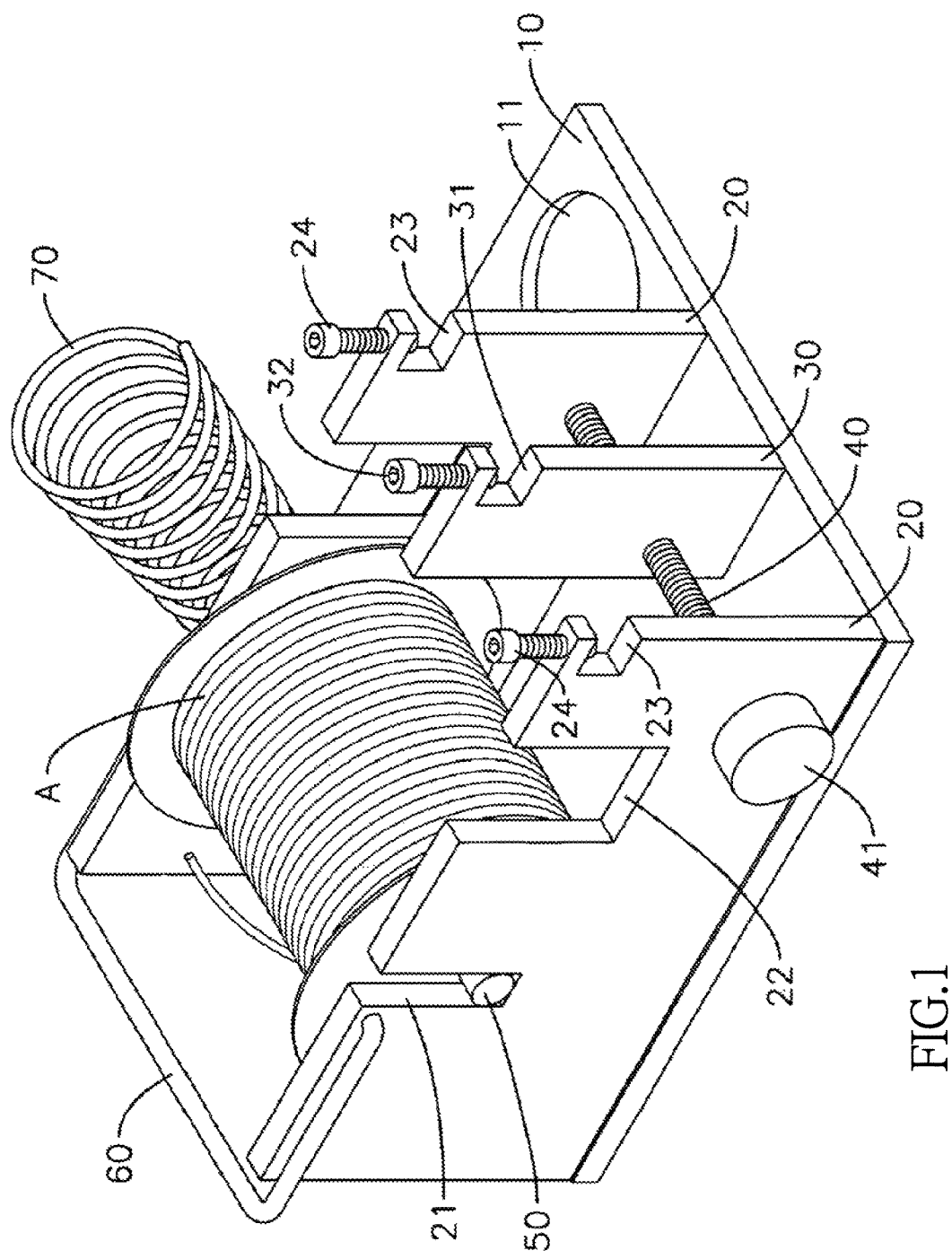
FIG. 1 is a perspective view to show the worktable of the present invention.
Figure 2:
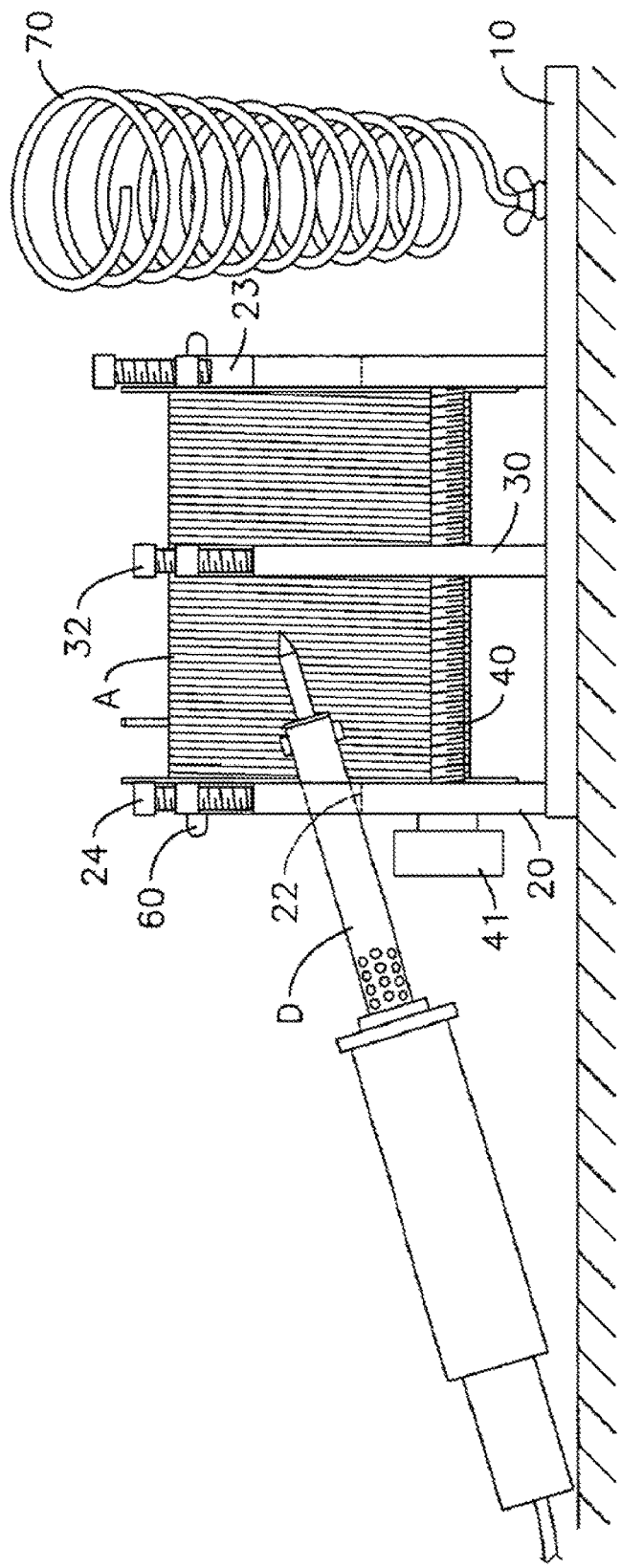
FIG. 2 is a front view to show the worktable of the present invention equipped with the soldering wire roll and the soldering iron.
Figure 3:
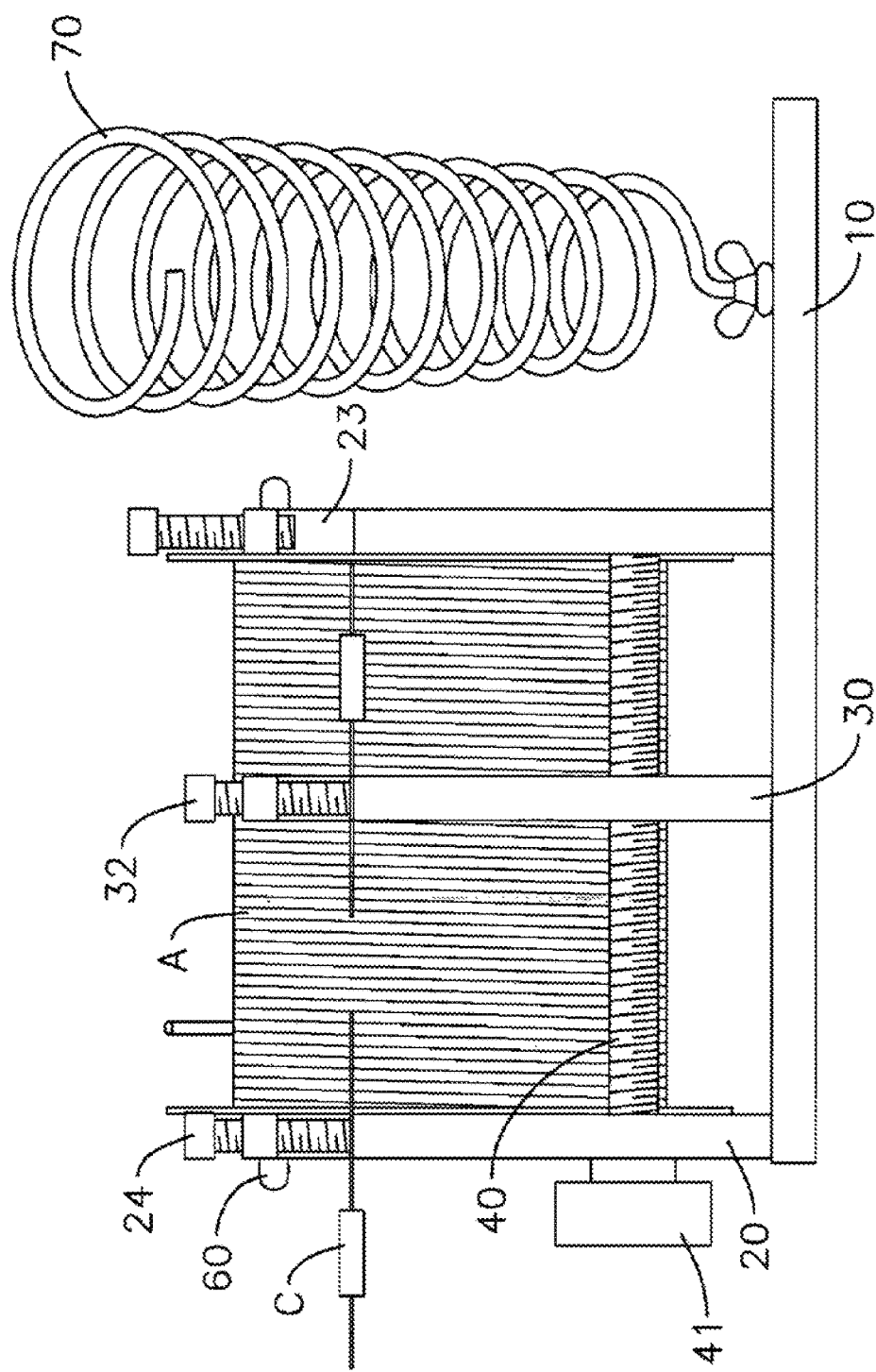
FIG. 3 is a front view to show the worktable of the present invention, wherein two parts are secured by the locking members.

Referring to FIGS. 1 and 2, the worktable of the present invention comprises a base plate 10, and two fixed plates 20 perpendicularly extend from the top of the base plate 10. Each fixed plate 20 includes a first locking member 24 and a first notch 23 which is defined in the front end of the fixed plate 20 corresponding thereto. The first locking member 23 is a bolt in this embodiment, and can be extended through the top of the fixed plate 20 and inserted into the first notch 23 to clamp a part "C" as shown in FIG. 3. The two respective first notches 23 of the two fixed plates 20 are located corresponding to each other.

A movable plate 30 is movably located between the two fixed plates 20 and has a second notch 31 defined in the front end thereof. A second locking member 32 is connected to the top of the movable plate 30 and can be extended through the top of the movable plate 30 and inserted into the second notch 31 to clamp a part "C". In this embedment, the second locking member 32 is a bolt. The two respective first notches 23 of the two fixed plates 20 and the second notch 31 of the movable plate 30 are located corresponding to each other.

An adjustment member 40 perpendicularly and rotatably extends through the two fixed plates 20 and perpendicularly and threadedly extends through the movable plate 30. One of two ends of the adjustment member 40 extends beyond one of the two fixed plates 20 and has a knob 41 connected thereto. In this embodiment, the adjustment member 40 is a threaded rod. When rotating the adjustment member 40, the movable plate 30 is moved between the two fixed plates 20.

Figure 6:
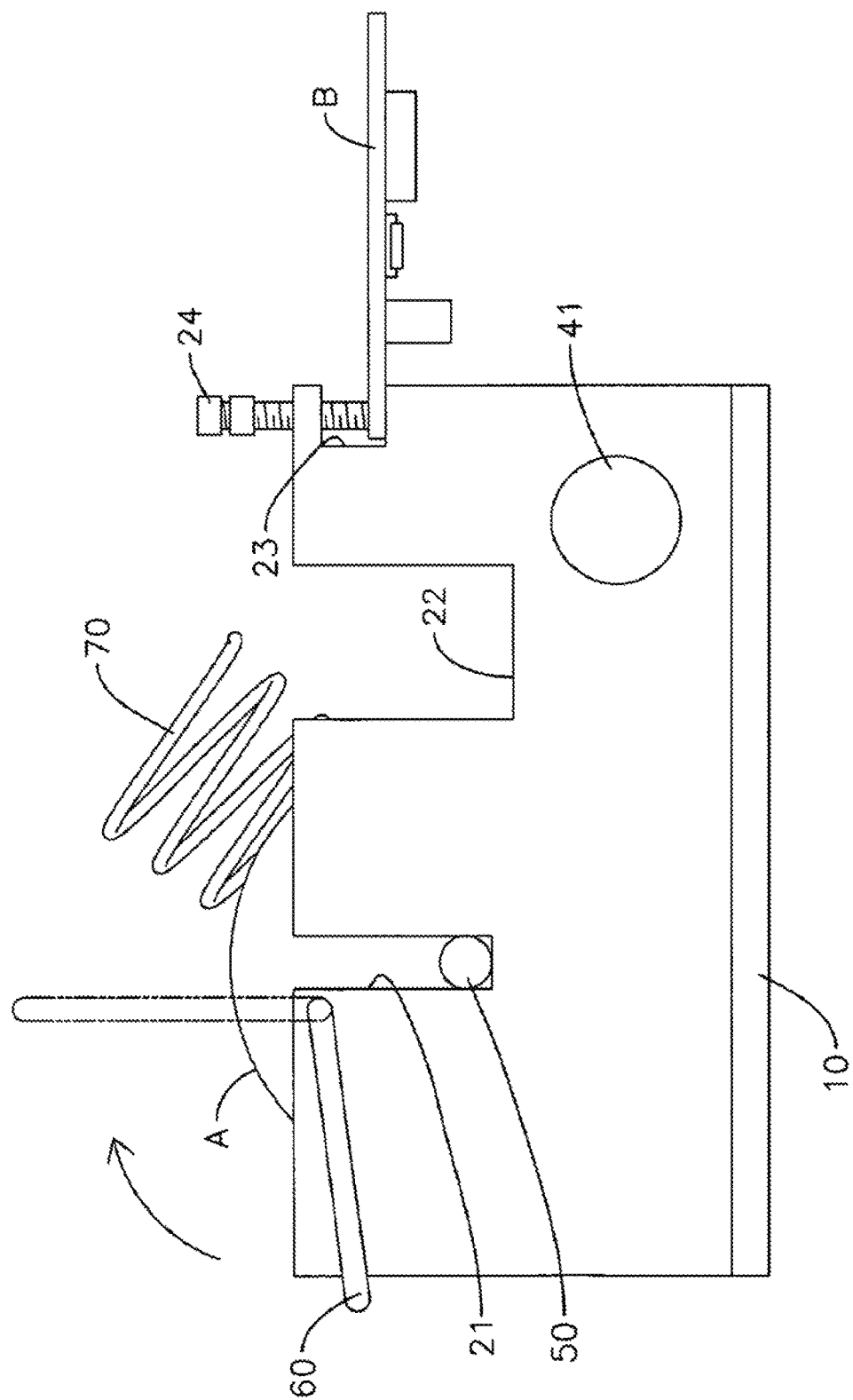
FIG. 6 is a side view to show that the handle is pivotable.

Each of the fixed plates 20 has a slot 21 defined therein, and an axle 50 having two ends thereof respectively located in the two respective slots 21. A soldering wire roll "A" is mounted to the axle 50. The base plate 10 has an extension portion extending beyond one of the two fixed plates 20, and the extension portion has a reception portion 11. A sponge or soldering paste can be placed in reception portion 11. A soldering iron seat 70 is connected to the extension portion of the base plate 10 and located beside one of the two fixed plates 20. In this embodiment, the soldering iron seat 70 is a coiled tube and the lower end of the coiled tube is fixed to the extension portion of the base plate 10. Each of the two fixed plates 20 includes a recess 22 defined in the top thereof. A handle 60 is connected across the two fixed plates 20 so as to be pivoted upward, and the user can carry the worktable by holding the handle 60 as shown in FIG. 6. As shown in FIG. 2, the soldering iron "D" can be placed on either one of the two recesses 22 when not in use.

Figure 4:
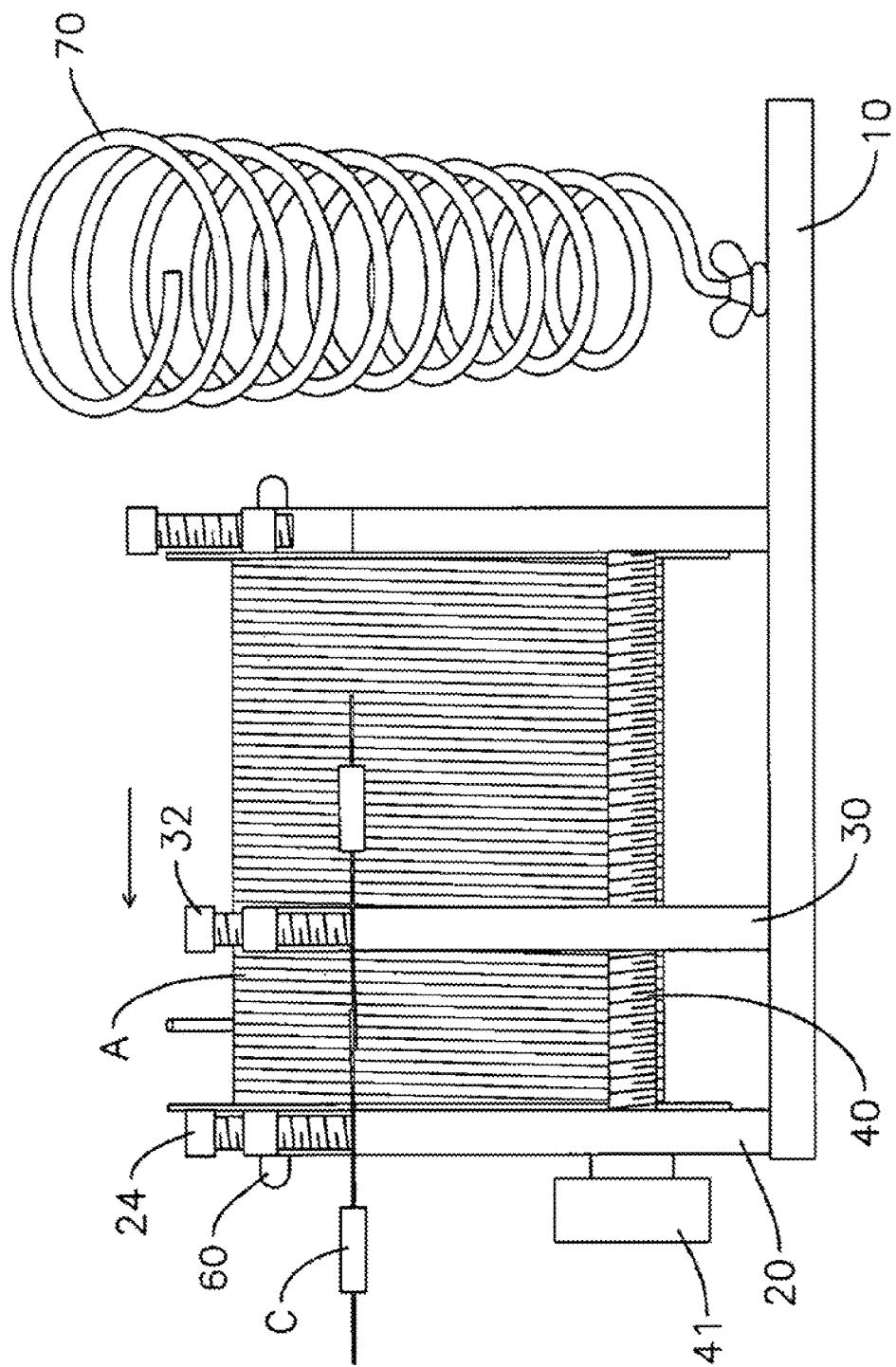
FIG. 4 is a front view to show the worktable of the present invention, wherein two parts are secured, overlapped and aligned by the locking members.
Figure 5:
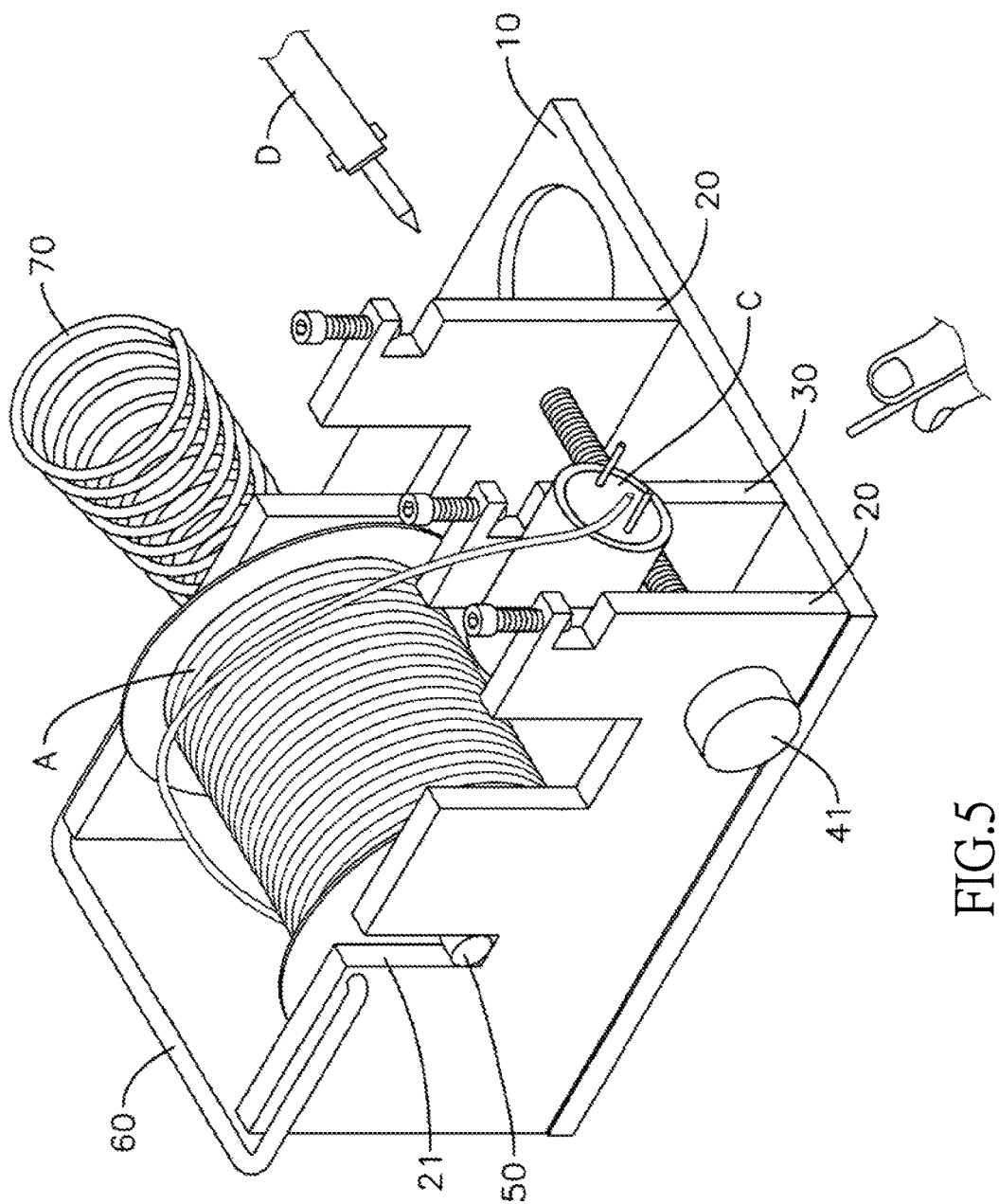
FIG. 5 is a perspective view to show the worktable of the present invention, wherein a part is clamped between the fixed plate and the movable plate.
Figure 6A:
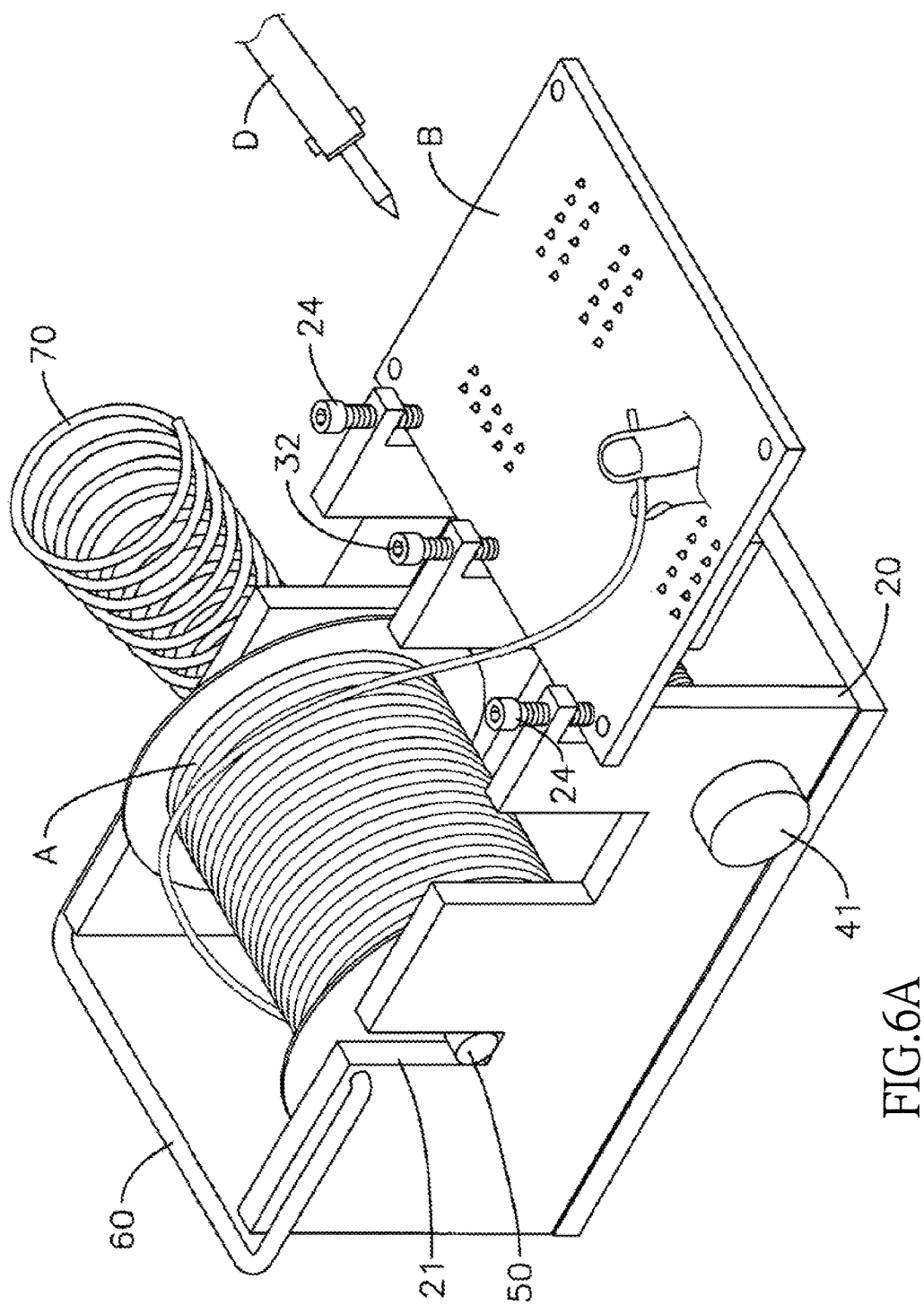
FIG. 6A is a perspective view to show the worktable of the present invention, wherein a circuit board is secured by the locking members.
Figure 6B:
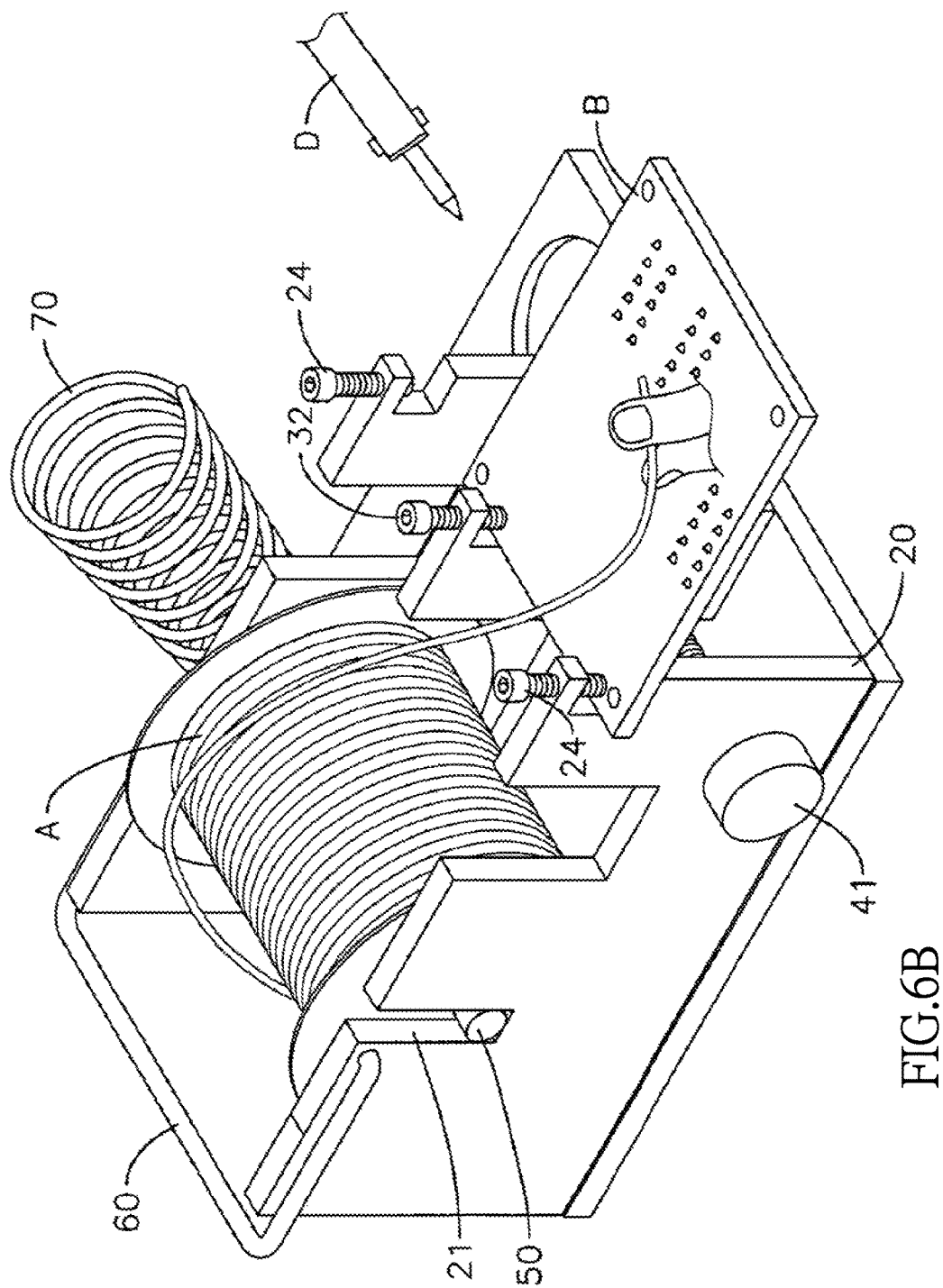
FIG. 6B is a perspective view to show the worktable of the present invention, wherein another circuit board is secured by the locking members.

FIGS. 3 and 4 show that the first and second locking members 24, 32 are used to secure parts to be soldered. The user may rotate the knob 41 to spin the adjustment member 40, so that the movable plate 30 is moved toward a part "C" for fitting distance to solder together. When soldering the part "C" such as a capacitor as shown in FIG. 5, the part "C" is clamped between the movable plate 30 and one of the two fixed plates 20. FIGS. 6A and 6B show that the first and second locking members 24, 32 are used to secure a circuit board "B".

Figure 7:
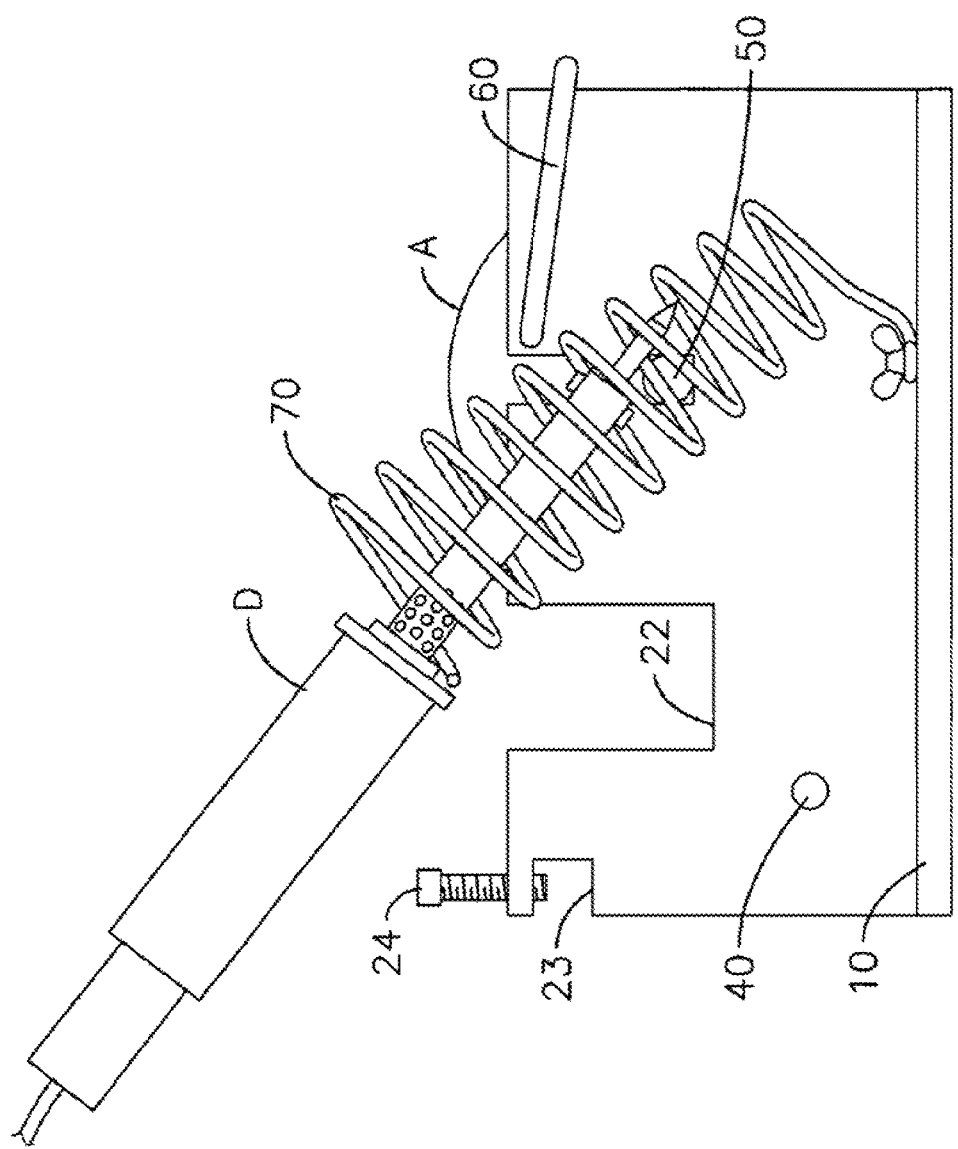
FIG. 7 shows that a soldering iron is inserted into the soldering iron seat.
Figure 8:
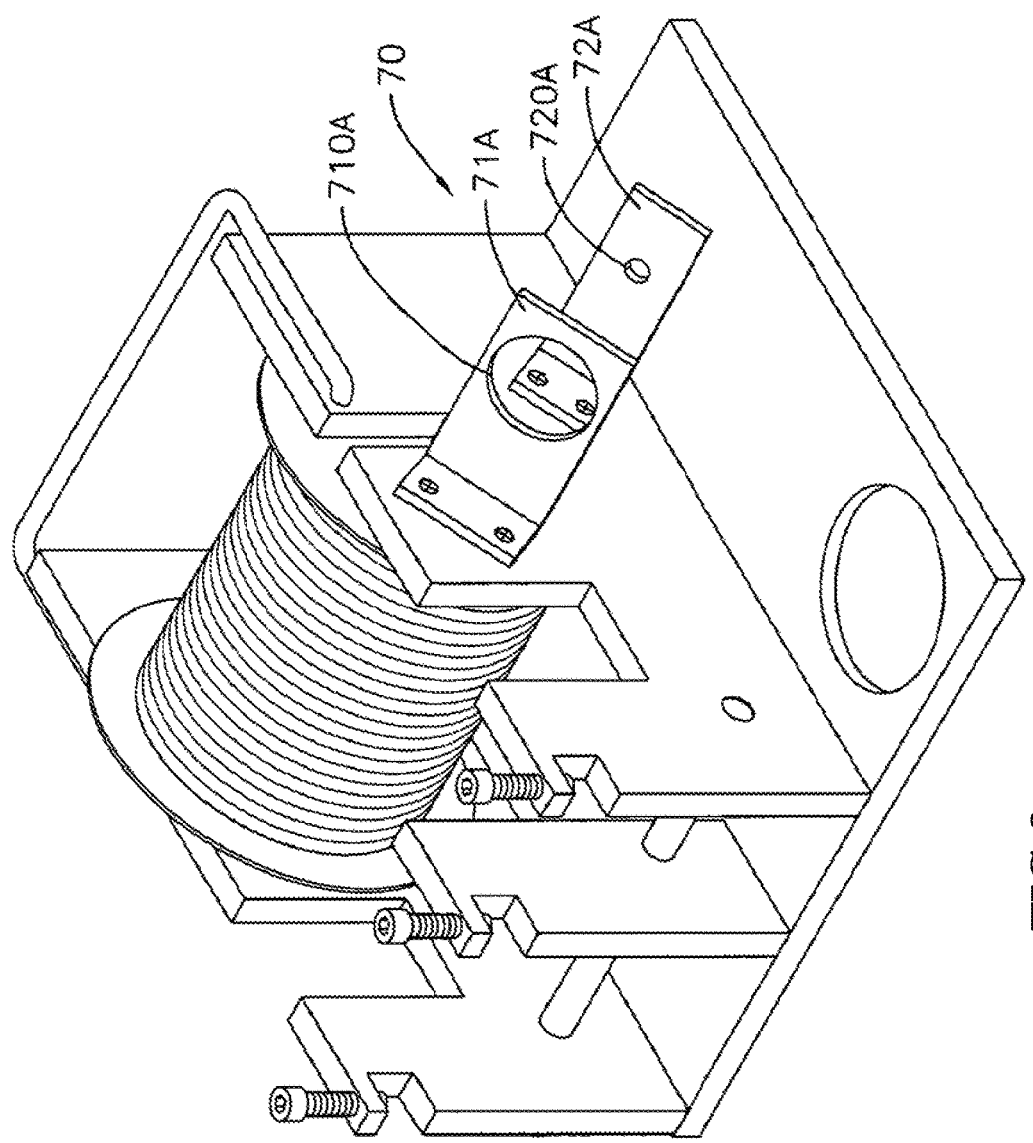
FIG. 8 shows a second embodiment of the soldering iron seat.
Figure 9:
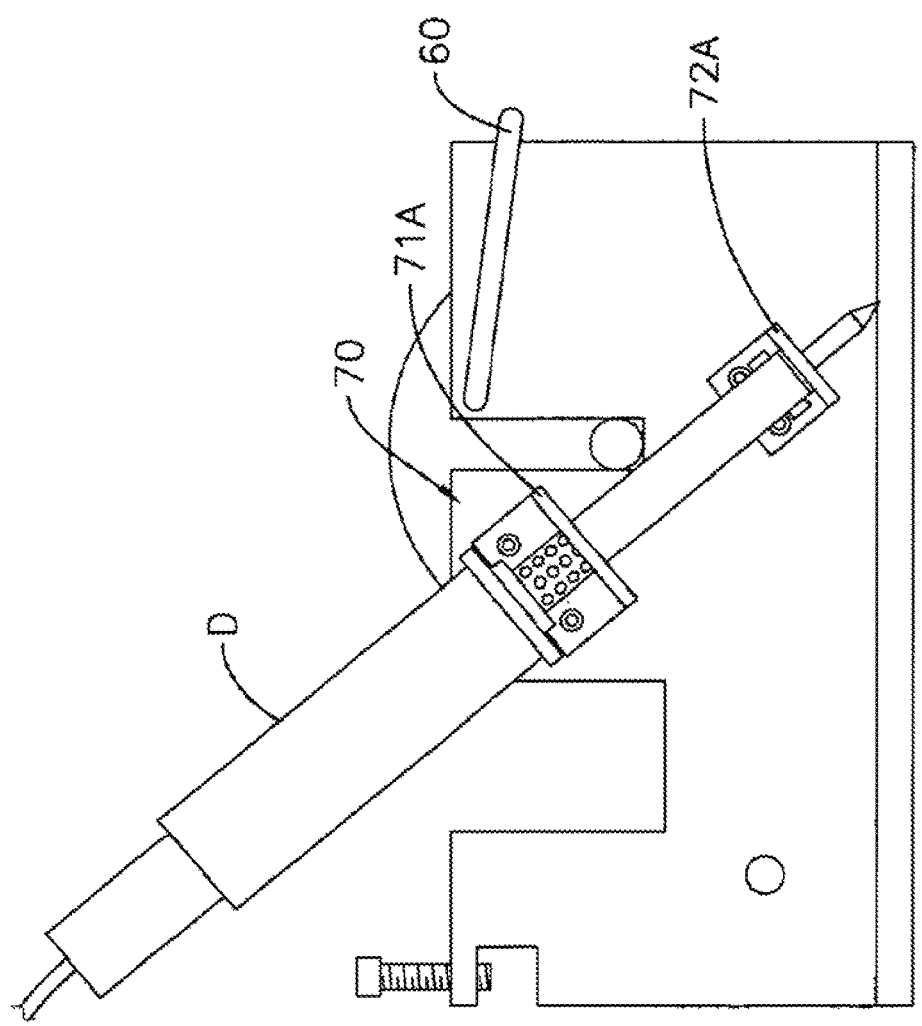
FIG. 9 shows that a soldering iron is inserted into the soldering iron seat in FIG. 8.
Figure 11:
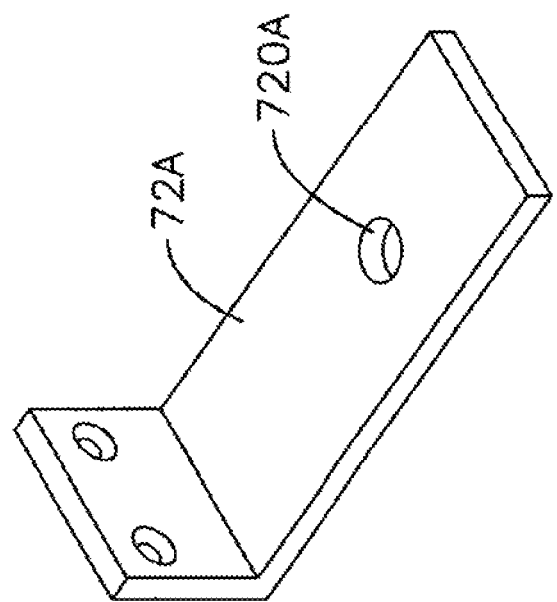
FIG. 11 is a perspective view to show the bottom plate of the soldering iron seat in FIG. 8.
Figure 10:
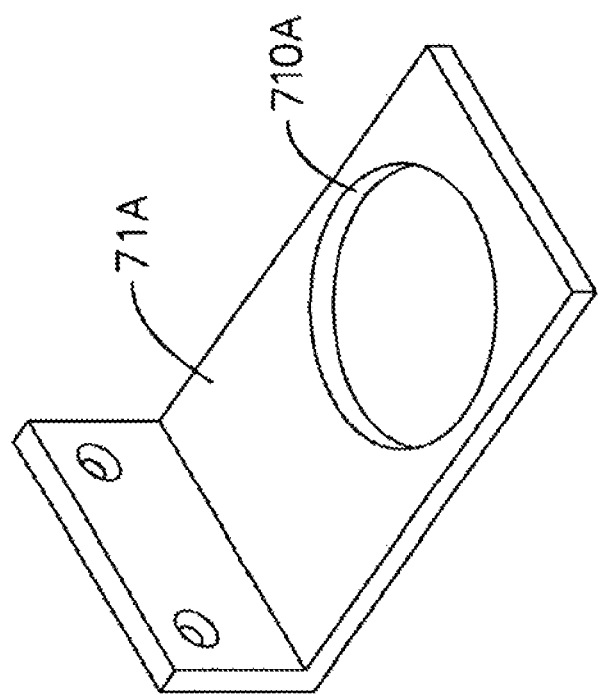
FIG. 10 is a perspective view to show the top plate of the soldering iron seat in FIG. 8.

By rotating the first and second locking members 24, 32 which are inserted into the first and second notches 23, 31 to secure the parts, and the user pulls the soldering wire from the soldering wire roll "A" by one hand, and operates the soldering iron "D" by the other hand to proceed soldering processes. The worktable is small and easily carried; the parts are well secured so that the soldering processes can be conveniently processed. The soldering iron "D" is inserted into the soldering iron seat 70 when not in use as shown in FIG. 7.

FIGS. 8 to 11 show the second embodiment of the soldering iron seat 70 which includes a top plate 71A and a bottom plate 72A which is in proper distance to the top plate 71A. The top and bottom plates 71A, 72A are fixed to outside of one of the two fixed plates 20. The top plate 71A has a top reception portion 710A, and the bottom plate 72A has a bottom reception portion 720A which is located corresponding to the top reception portion 710A. The top reception portion 710A is larger than the bottom reception portion 720A, so that the soldering iron "D" passes through the top reception portion 710A, and the distal end of the soldering iron "D" is inserted into the bottom reception portion 720A.

While we have shown and described the embodiment in accordance with the present invention, it should be clear to those skilled in the art that further embodiments may be modified without departing from the scope of the present invention.

What is claimed is:

1. A worktable for a soldering iron, comprising:
a base plate (10);
two fixed plates (20) perpendicularly extending from a top of the base plate (10), at least one of the fixed plates (20) having a first locking member (24) and a first notch (23) which is defined in a front end of the fixed plate (20) thereto, the first locking member (24) extending through a top of the fixed plate (20) and inserted into the first notch (23), the two fixed plates (20) located corresponding to each other, and
a movable plate (30) movably located between the two fixed plates (20) and having a second notch (31) defined in a front end thereof, a second locking member (32) connected to a top of the movable plate (30) and extending through the top of the movable plate (30) and inserted into the second notch (31), the first notch (23) of at least one of the two fixed plates (20) and the second notch (31) of the movable plate (30) located corresponding to each other.

2. The worktable as claimed in claim 1, wherein each of the fixed plates (20) has a slot (21) defined therein, an axle (50) having two ends thereof respectively located in the two respective slots (21), a soldering wire roll (A) is mounted to the axle (50), a soldering iron seat (70) is located beside one of the two fixed plates (20).

3. The worktable as claimed in claim 1, wherein an adjustment member (40) perpendicularly and rotatably extends through the two fixed plates (20) and perpendicularly and threadedly extends through the movable plate (30), one of two ends of the adjustment member (40) extends beyond one of the two fixed plates (20) and has a knob (41) connected thereto.

4. The worktable as claimed in claim 1, wherein the base plate (10) has an extension portion extending beyond one of the two fixed plates (20), the extension portion has a reception portion (11).

5. The worktable as claimed in claim 2, wherein the soldering iron seat (70) is a coiled tube.

6. The worktable as claimed in claim 4, wherein the soldering iron seat (70) is a coiled tube and a lower end of the coiled tube is fixed to the extension portion of the base plate (10).

7. The worktable as claimed in claim 2, wherein the soldering iron seat (70) includes a top plate (71A) and a bottom plate (72A) which is a predetermined distance to the top plate (71A), the top and bottom plates (71A, 72A) are fixed to outside one of the two fixed plates (20), the top plate (71A) has a top reception portion (710A), the bottom plate (72A) has a bottom reception portion (720A) which is located corresponding to the top reception portion (710A).

8. The worktable as claimed in claim 1, wherein a handle (60) is connected across the two fixed plates (20).

9. The worktable as claimed in claim 1, wherein at least one of the two fixed plates (20) includes a recess (22) defined in the top thereof.

* * * * *